Dec. 11, 1934.    G. SUMMERS    1,983,886
WATER TUBE BOILER
Filed March 23, 1932    2 Sheets-Sheet 1

INVENTOR
*George Summers*
BY
ATTORNEY

Dec. 11, 1934.                G. SUMMERS                1,983,886
WATER TUBE BOILER
Filed March 23, 1932    2 Sheets-Sheet 2

INVENTOR
George Summers
BY
ATTORNEY

Patented Dec. 11, 1934

1,983,886

UNITED STATES PATENT OFFICE 1,983,886

WATER TUBE BOILER

George Summers, Harrow Weald, Harrow, England, assignor to The Babcock & Wilcox Company, Bayonne, N. J., a corporation of New Jersey Application March 23, 1932, Serial No. 600,630
In Great Britain March 27, 1931

5 Claims. (Cl. 122—478)

This invention relates to the construction of water tube boilers, and more particularly to water tube boilers having one or more upper steam and water drums connected by banks of vertically inclined tubes with a lower mud drum or drums.

The general object of my invention is the provision of a water tube boiler of the type described having an improved construction and arrangement of the fluid heating surface therein. A further and more specific object is the provision of a water tube boiler of the type described with an arrangement of the fluid heating elements effecting an increased absorption of radiant heat and protection of the exposed wall surface without decreasing the effectiveness of the heating gas flow through the boiler or increasing the number or requiring a different arrangement of tube openings in the drums. A further object is the provision of a water tube boiler of the type described with a construction and arrangement of the fluid heating surface which can be easily and rapidly modified for changes in operating conditions tending to effect undesirable furnace temperature conditions.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Figure 2:
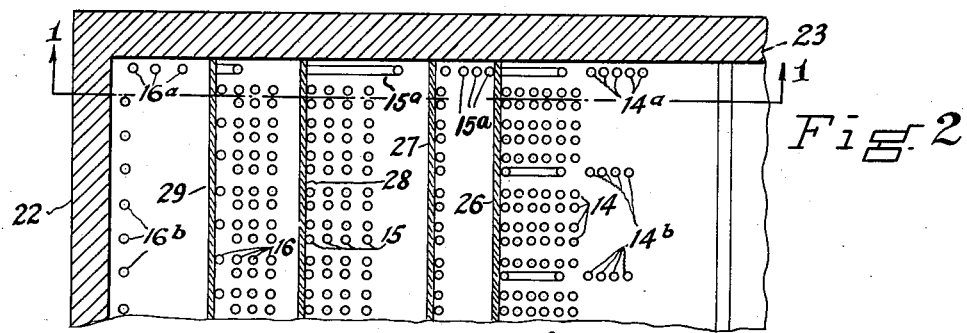
Figure 1:
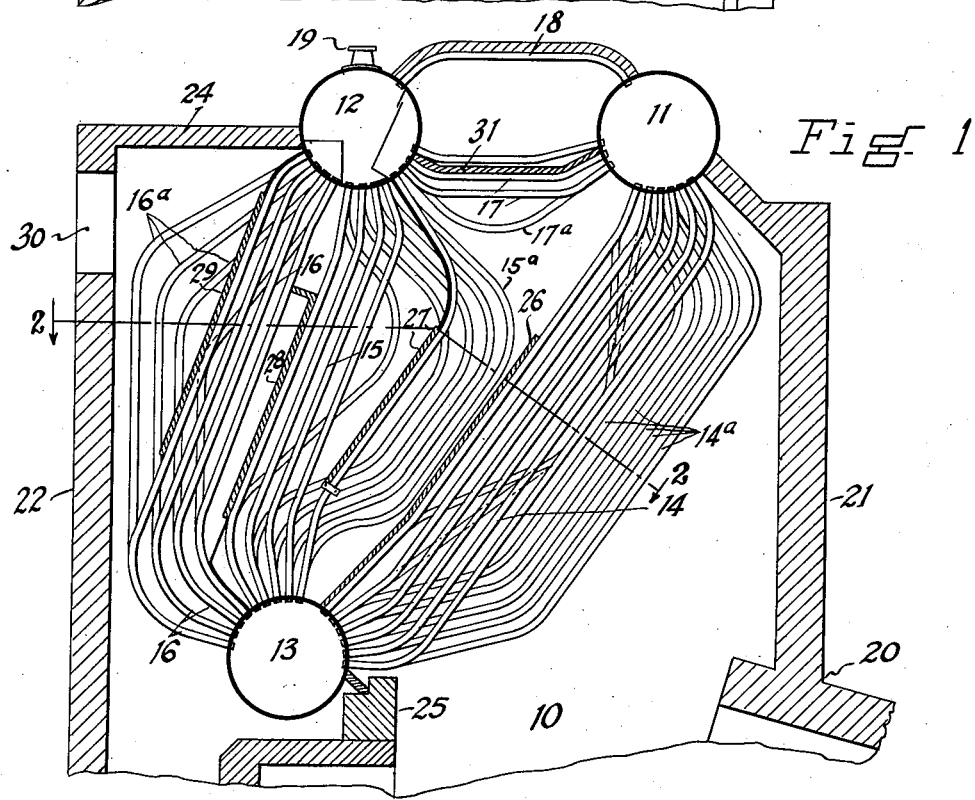
Figure 3:
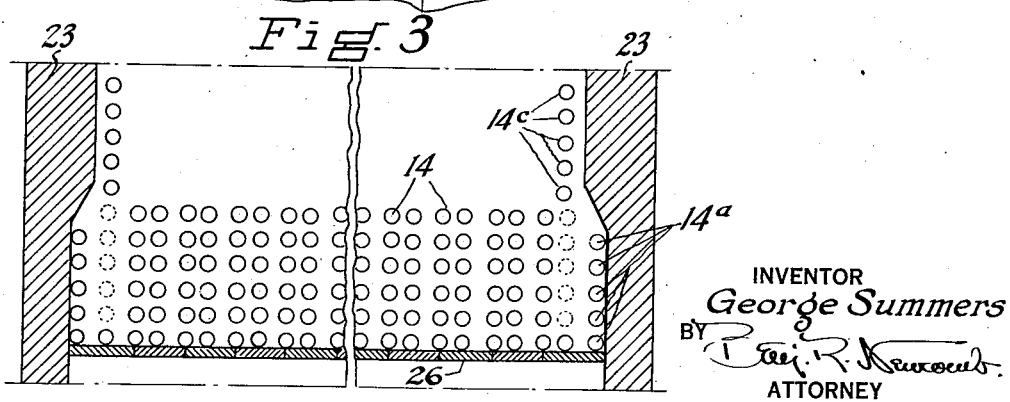
Figure 5:
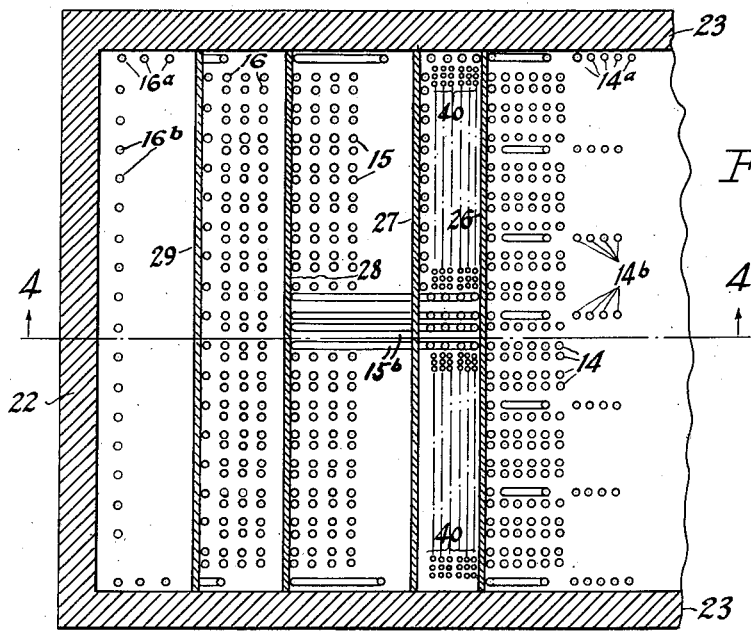
Figure 4:
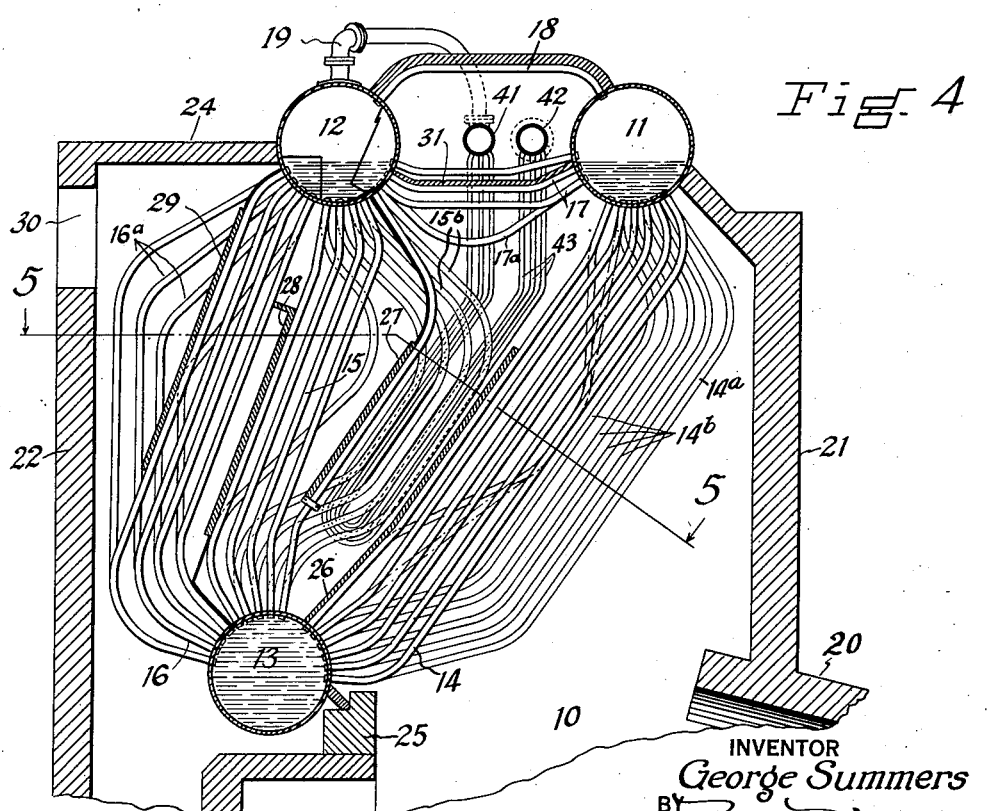

Of the drawings, Fig. 1 is a sectional elevation partly broken away on the line 1—1 of Fig. 2, illustrating a water tube boiler constructed in accordance with my invention; Fig. 2 is a section on the line 2—2 of Fig. 1; Fig. 3 is a fragmentary sectional plan view illustrating a modified construction; Fig. 4 is a view similar to Fig. 1 on the line 4—4 of Fig. 5, and illustrating a modification; and Fig. 5 is a view similar to Fig. 2 and taken on the line 5—5 of Fig. 4.

The invention is illustrated in Figs. 1 and 2 as embodied in a three-drum Stirling boiler having a furnace chamber 10, front and rear upper or steam and water drums 11 and 12, respectively, and a lower or mud drum 13. The drums 11 and 13 are connected by a bank of vertically inclined bent water tubes 14 constituting the front tube bank of the boiler and defining the upper rear portion of the furnace chamber. The drums 12 and 13 are also connected by a plurality of vertically inclined water tubes constituting forward and rearward sections 15 and 16, respectively, of a divided rear tube bank of the boiler. The steam and water drums 11 and 12 are connected by water circulators 17 and steam circulators 18 and a steam outlet 19 is positioned on the rear drum. The boiler heating surface described is arranged in a setting 20 having front and rear vertical wall portions 21 and 22, respectively, and vertical side walls 23. The drums 11 and 12 are arranged transversely of the roof 24 of the setting, while the drum 13 is adjacent to a bridge-wall 25.

The tube bank 14 and tube bank sections 15 and 16 are each formed by a plurality of rows of water tubes extending transversely of the boiler between the side walls 23 thereof with the ends of the tubes bent and radially connected to corresponding drums. In the construction shown, the tubes of each row lie in the same vertical planes as the corresponding tubes of the adjacent rows. The tube bank 14 contains six rows of tubes, the tube bank section 15 five rows, and the section 16 four rows of tubes. Inclined baffles 26, 27, 28 and 29 are mounted on spaced tube rows, the baffles 26 and 28 extending upwardly from the mud drum and the baffles 27 and 29 extending downwardly from the steam and water drum 12 and all cooperating to provide a heating gas flow upwardly along the front bank of tubes, then downwardly along the front row of tubes in the tube section 15, then upwardly along the remaining tube rows of the section 15, then downwardly along the tubes in the section 16, and upwardly through the space between the section 16 and the rear wall of the boiler, to the heating gas outlet 30. A horizontal baffle 31 is carried on the water circulators 17 for the protection of the drums, and to facilitate the reversal of flow of the heating gases between the first and second gas pass.

It will be noted that with the construction described, the first row of tubes in the front bank is exposed to the radiant heat of the furnace 10 and to contact with the heating gases while at substantially their highest temperature. The remaining tubes are heated mainly by convection. The triangular portions of the side walls 23 forwardly of the front tube bank and also between the water circulators and front and rear tube banks are ordinarily exposed to high gas temperatures, and in operation will be heated to a substantial temperature. Much of the heat absorbed by these side wall portions will be dissipated to the external atmosphere by radiation. The same condition are present, but to a lesser degree, at the upper portion of the rear wall 22 and side wall portions adjacent the heating gas outlet 30.

To obtain the most desirable combustion conditions in the furnace, the furnace must be maintained at a substantial temperature. If the furnace temperature becomes higher than the desired value, the furnace wall material will disintegrate and be eroded while if the temperature becomes too low incomplete combustion will result. The desired temperature will vary with different furnaces and with fuels of different heating values. The furnace temperature for each set of operating conditions mainly depends upon the amount of radiant heat absorbed by the furnace walls and exposed fluid heating surface. Under modern furnace conditions, the furnace walls would become rapidly overheated and be eroded unless properly protected.

In accordance with my invention, the exposed wall portions of the setting are protected, the available heat more effectively utilized, and the furnace temperature controlled by arranging tubes in one or more of the tube banks to project beyond the other tubes of the bank and into spaces within the setting ordinarily unoccupied by the tube banks or furnace water walls in a standard boiler of this type. It is usually considered to be impracticable to extend water wall surface above the top of the bridge-wall in a Stirling type boiler. Preferably some of the tubes so projected are arranged adjacent the side walls of the setting and serve to reduce the temperature of these normally unprotected wall portions. For this purpose, the end tubes 14a in the first five rows of the front tube bank have intermediate portions projecting forwardly beyond the remaining tubes in the front row of that bank and extending along the side walls 23. A substantial amount of the otherwise exposed triangular side wall areas will be covered by the tube projecting portions. In order to prevent free passage of the heating gases through the gaps or lanes left in the bank by this arrangement of the tubes, the end tubes in the remaining row are bent forwardly to a lesser extent and preferably to a point in transverse alignment with the remaining tubes in the first or second rows. The projecting tubes are preferably bent and spaced in accordance with amount of wall area desired to be cooled. The side wall portion normally alongside the end tubes of the rows will be adequately protected by the partly projected end tubes and the next to the end tubes in each row.

The substantially triangular normally exposed side wall areas between the front and rear tube banks are partly reduced in size by the downward projection of one or more water circulators 17a along each side wall. The remaining portions of the triangular wall area are substantially covered by projecting portions of the end tubes 15a of the first four rows of the bank section 15 forwardly of the bank and preferably between the baffles 26 and 27, while the end tubes of the rear row are projected forwardly to a lesser extent and serve to partially fill the gaps left by the other projected tube portions.

The end tubes 16a of the three rows at the rear of the tube bank section 16 are projected rearwardly beyond the bank and along side the rear portion of the side walls. The end tubes of the front row of this bank section also project rearwardly, but to a lesser extent, and close the gaps in the tube bank.

As shown in Fig. 2, the upper portion of the rear wall is afforded protection by a cooling surface composed of projected portions of spaced intermediate tubes 16b in the rearmost row of the bank section 16. The number of such tubes may be varied as conditions require.

In order to provide furnace temperature conditions suitable for the fuel used, but without special wall tube constructions, the portion of the tube bank surface absorbing radiant heat from the furnace may be increased by projecting corresponding tubes 14b in the front rows of the front tube bank forwardly of the bank in a manner generally similar to the arrangement of the end tubes 14a of those rows. In the present construction shown, corresponding tubes in the first four rows are so projected, while the corresponding tubes in the fifth row are projected to a lesser extent and serve to fill the gap so formed in the tube bank. The corresponding tubes in the sixth row are left in their normal position. The projected tubes are spaced apart sufficiently to have all of their surfaces exposed to radiation from the furnace chamber. The described tube construction substantially increases the amount of radiant heat absorbing surface present without increasing the number or arrangement of the tube openings required in the drums 11 and 13. Whenever operating conditions make it desirable, such as due to a change in fuels, the furnace temperature normally maintained can be varied by changing the number of projecting tubes in each group, their extent of projection, and/or the transverse spacing of the projecting tube groups. In this way, the most desirable furnace temperature conditions can be obtained.

In Fig. 3 I have illustrated a boiler construction similar to that shown in Figs. 1 and 2, but in which portions of the side walls in advance of one or more of the tube banks are stepped inwardly. In such a construction, it is preferable to project the next to the last tubes 14c in each row of the adjacent banks in the manner heretofore described for the protection of the side walls rather than the end tubes 14a of that bank, inasmuch as by this arrangement lateral bending of the wall projecting tubes is avoided.

The modification illustrated in Figs. 4 and 5, is especially adapted for very wide boilers wherein a convection heated superheater is divided into transversely spaced tube sections 40, and positioned in the triangular space between the front and rear tube banks. Such a divided arrangement improves the steam circulation through the superheater and reduces the length of the steam conduit connections from the drum 12. Each superheater section shown consists of inlet and outlet headers 41 and 42, respectively, located in the space above the circulator baffle 31 and connected by nested rows of U-shaped tubes 43 extending downwardly into the gas pass formed between the baffles 26 and 27. Such a construction would leave a vertical gap between the superheater sections for the free passage of the heating gases. This condition is avoided as shown in Figs. 4 and 5 by projecting corresponding tubes 15b in several rows of the forward section 15 of the rear tube bank forwardly into the space between the superheater sections. Corresponding tubes in the adjacent rear row are projected forwardly to a lesser extent to fill the gap that would otherwise be formed in this tube bank section.

While in accordance with the provisions of the statutes I have illustrated and described herein the best forms of my invention known to me, those skilled in the art will understand that changes may be made in the form of the constructions disclosed without departing from the spirit of the invention covered by my claims, and that certain features of my invention may sometimes be used to advantage without a corresponding use of other features.

I claim:

1. A water tube boiler comprising a combustion chamber, an upper steam and water drum connected to a lower mud drum by a bank of tubes arranged in rows extending transversely of said combustion chamber, corresponding tubes in a plurality of said rows having portions projecting forwardly beyond said bank and arranged to absorb radiant heat from said combustion chamber, and a tube arranged to close the lane in said bank left by said projecting tube portions.

2. A water tube boiler comprising a combustion chamber, an upper steam and water drum connected to a lower mud drum by a bank of tubes arranged in rows extending transversely of said combustion chamber, the tubes in each row being horizontally spaced and in alignment with the tubes in the remaining rows, corresponding tubes in a plurality of rows at the front end of said bank having bent portions projecting forwardly beyond the plane of the remaining tubes in the first row of said bank and arranged to absorb radiant heat from said combustion chamber, and a corresponding tube in another of said rows having a bent portion arranged to obstruct the gas lane formed by said other bent tube portions.

3. A water tube boiler comprising a setting having vertical side walls, a combustion chamber, a plurality of horizontally spaced upper steam and water drums, a row of water circulators connecting said drums, a lower mud drum, front and rear banks of tubes connecting said upper drums to said mud drum, the tubes in each of said banks being arranged in rows extending transversely of said combustion chamber between said side walls, corresponding tubes in adjacent rows at the front end of said rear bank having portions projecting forwardly beyond the remaining tubes in said row and adjacent one of said side walls, and a water circulator being bent downwardly out of said circulator row and adjacent said side wall and cooperating with said projecting tube portions to cool said wall.

4. A water tube boiler comprising a setting having vertical side walls, a combustion chamber, a plurality of upper steam and water drums, a lower mud drum, front and rear banks of vertically inclined tubes connecting said upper drums to said lower drum, the tubes in said banks being arranged in rows extending transversely of said combustion chamber between said side walls, superheater tubes arranged in transversely spaced sections intermediate said tube banks, and corresponding tubes in several of said rows of said rear bank having portions projecting forwardly beyond the remaining tubes in said bank and occupying the space between said superheater sections.

5. A water tube boiler comprising a setting having vertical side walls, a combustion chamber, a plurality of upper drums, a lower drum, banks of vertically inclined tubes connecting said upper drums to said lower drum, the tubes in said banks being arranged in rows extending transversely of said combustion chamber between said side walls, superheater tubes arranged in transversely spaced sections intermediate two of said tube banks, and corresponding tubes in several of said rows of one of the last named tube banks having portions projecting beyond the remaining tubes in said rows and occupying the space between said superheater sections.

GEORGE SUMMERS.